United States Patent [19]
Shono

[11] 3,995,289
[45] Nov. 30, 1976

[54] EXCHANGE LENS ASSEMBLY WITH DATA PHOTOGRAPHIC SYSTEM
[75] Inventor: Tetsuji Shono, Ranzan, Japan
[73] Assignee: Asahi Kogaku Kogyo Kabushiki Kaisha, Tokyo, Japan
[22] Filed: Oct. 2, 1975
[21] Appl. No.: 618,992

[30] Foreign Application Priority Data
Oct. 4, 1974    Japan .................... 49-120085[U]

[52] U.S. Cl. ................ 354/109; 354/105; 354/289
[51] Int. Cl.² .......................................... G03B 17/24
[58] Field of Search ............ 354/105, 109, 289, 53, 354/54; 350/243, 242, 19, 175 R; 352/90; 355/39

[56] References Cited
UNITED STATES PATENTS 3,021,769    2/1962    Mann ........................... 354/105 X
3,082,424    3/1963    Laird ........................... 354/105 X FOREIGN PATENTS OR APPLICATIONS
D16,989    2/1956    Germany ........................... 354/105

Primary Examiner—L. T. Hix
Assistant Examiner—E. M. O'Connor
Attorney, Agent, or Firm—Sughrue, Rothwell, Mion, Zinn & Macpeak

[57] ABSTRACT

An exchange lens assembly integrally supports a rotatable data plate illuminated by exterior light incident upon the exchange lens bodytube through a condenser lens independent of the object focussing optical system. The iris value setting ring controlling light transmission through the object focussing optical system also controls light transmission through the data plate and its separate focussing optical lens for simultaneous photographing on the film of the field image and a selected data character.

2 Claims, 2 Drawing Figures

EXCHANGE LENS ASSEMBLY WITH DATA PHOTOGRAPHIC SYSTEM

BACKGROUND OF THE INVENTION

1. Field of the Invention

This invention relates to exchange lens assemblies and more particularly to such an exchange lens assembly which carries its own means for simultaneously photographically recording data characters on the photographic film.

2. Description of the Prior Art

Heretofore, various devices have been proposed and put to practical use, in which during photographing, data is superimposed onto an image plane of a film or a frame portion thereof. In conventional cameras which are capable of photographing data by means of the device as described, however, the device is incorporated in the camera body or the device of this sort comprising a special mechanism externally mounted on the camera body, and hence, the camera body must act as an apparatus for the exclusive use of being capable of photographing data, and no practical means has yet been found, which is able to photograph data by use of a common camera which is not designed as such exclusive apparatus.

It is, therefore, an object of the present invention to provide an exchange lens, for conventional lens exchange type single lens reflex camera incorporating a photographing device capable of photographing data changeagble with the photographic objective.

SUMMARY OF THE INVENTION

A preferred embodiment of the present invention takes the form of an exchange lens assembly for attachment to a camera which supports a photographic film for photographing of a field image, the exchange lens assembly includes a body tube and a camera object focussing optical system mounted within the bodytube and an iris value setting ring rotatably mounted on the bodytube for controlling light transmission from the field image to the film through the focussing optical system. The improvement comprises a data photographing system integral with the exchange lens assembly, the data photographing system comprising a light window formed within the body tube for transmitting incident light exterior of the camera and independent of the light passing through the object focussing system, a data plate mounted within said body tube for rotation with respect thereto and in the path of the incident light passing through the light window, a focussing lens for focussing a selected character from the data plate onto the film in addition to the field image and a transmissive light control member operatively coupled to the iris value setting ring for varying the quantity of light transmission through the data plate and the focussing lens in conformance to the variance of light passing through the object focussing optical system.

Features of the device according to the present invention will now be described in detail with reference to a preferred embodiment shown in the accompanying drawings.

DESCRIPTION OF THE PREFERRED EMBODIMENT

Figure 1:
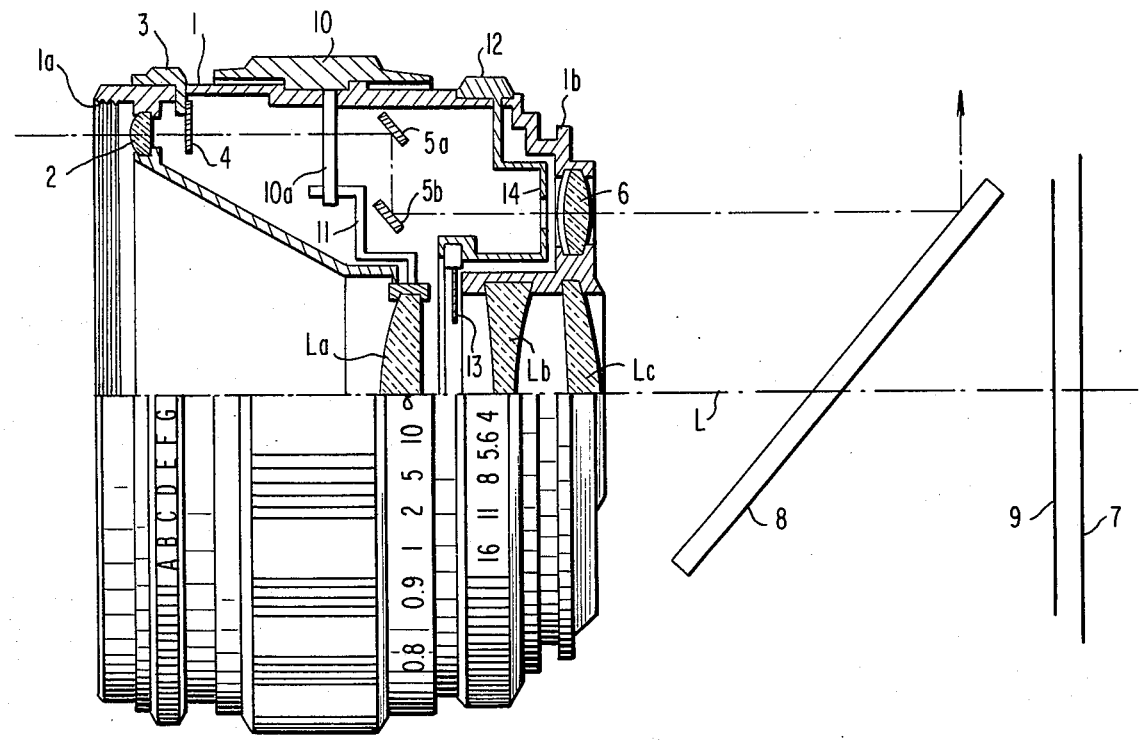
FIG. 1 is a partial sectional, partial longitudinal side view of a preferred embodiment of the exchange lens assembly in accordance with the present invention.
Figure 2:
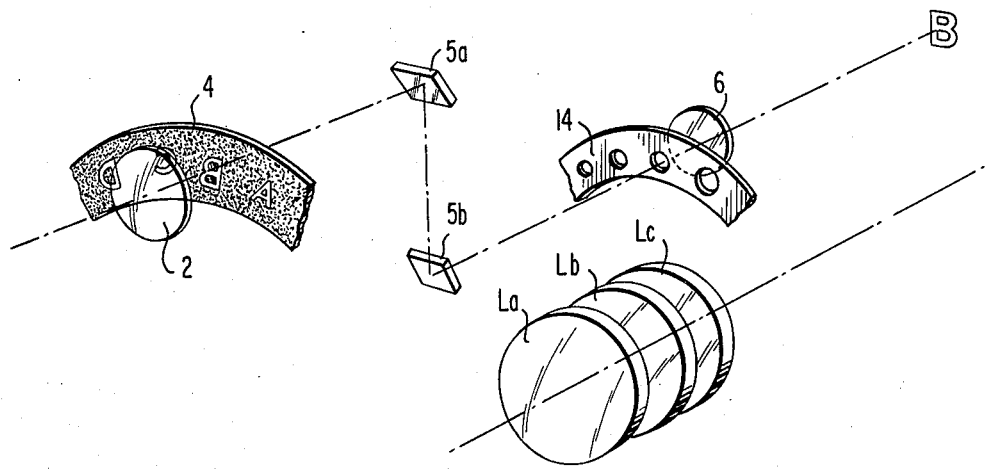
FIG. 2 is an exploded, perspective view of a portion of the lens assembly of FIG. 1 emphasizing the data photographing system.

In the vicinity of a screw thread $1a$ for attaching the lens assembly as an accessory to the camera, at the front end of a bodytube 1 there is disposed a lighting window with a condenser lens 2 arranged thereon independently of focussing optical system lens $La$, $Lb$ and $Lc$ of a photographic objective. On the other hand, a datum conversion ring 3 is rotatably mounted on the outer periphery of the bodytube 1, and to an extension of the conversion ring 3, within the bodytube 1, is secured a datum plate 4 rotatably integral therewith. This datum plate 4 is in the form of a transparent plate with characters, designs, marks, etc. representative of data, imprinted thereon with black letters or the like, or conversely it may take the form of a black ground plate with the aforementioned characters or the like transparently formed in an embossed state, and a portion having the aforementioned mark positioned in the lighting window with the condenser lens 2 arranged thereon is always illuminated by external light condensed by the lens 2. An illuminated data image on the datum plate 4 is transposed closer to an optical axis L of the photographic objective by means of reflection optical system elements such as mirrors $5a$ and $5b$ secured within the bodytube 1, and the data image is then directed to a focussing lens 6 fixed between a mount $1b$ on the lens side employed in mounting a bayonet mechanism or the like at the rear lens $Lc$ of the bodytube 1 and a frame for mounting a rear sphere of the photographic objective, thereby constituting a focussing optical system for the datum plate. In the focusing optical system for the datum plate there is arranged an iris 14 directly in front of the focussing lens 6 said iris serving as a transmissive light control member rotatable integral with an iris value setting ring 12 for presetting an iris blade 13 of the photographic objective. Iris 14 may take a form of a plurality of passage openings different in diameter as shown in FIG. 2, or may take other forms such as an aperture mechanism by way of the iris blade, a teardroplike aperture, or ND filter aperture, etc. The data image on the datum plate found by the focussing lens 6 may be focused on a film surface 7 and photographed by release of a focal plane shutter diaphragm 9 onto the image plane of the film surface or onto the frame portion simultaneously with the film exposure by the photographic objective. In a state of preparing the camera for photographing, prior to the release of shutter, the image on the datum plate is directed by a reflection mirror 8 to the viewfinder optical system similarly to an image in the field to be photographed by the photographic objective, and can be viewed by peeping through a finder eyepiece. The reference numeral 10 is a photographic length adjusting ring mounted on the bodytube 1, which is positioned in such a manner that a pin $10a$ coupled to a retainer ring 11 for the front sphere lens $La$ of the photographic lens does not cross the focussing optical system of the datum plate.

With the construction as described above, the operation to the present invention will now be described. First, in a state with the exchange lens of the invention mounted on the camera body, the datum conversion ring 3 is operated in a stage of preparing the camera for photographing so that data necessary for the specific photographing may be predetermined by registration or the like with indexes (not shown) provided on the bodytube 1. By this operation, the datum plate 4 with necessary data imprinted thereon, or an imprinted portion of the characters or the like is illuminated by external light from the lighting window. The illuminated data such as characters or the like are guided, through a focussing optical system comprising the reflection optical system elements 5a and 5b and the focussing lens 6 and the like, by a reflection mirror 8 mounted slantwise in the light path to the viewfinder optical system in the stage of preparing photographing, whereby the aforementioned data such as characters or the like may be viewed within the field of viewfinder by the viewfinder peeping operation such as arrestment of the object by operation of the photographic length adjusting ring 10.

Thus, the iris 14 in the focussing optical system of the datum plate may also be set in accordance with the iris value preset operation by the iris value setting ring 12 to the aperture corresponding to a predetermined value of aperture of the iris blade 13 in the photographic objective. In this condition, when the shutter of camera is operated, the reflection mirror 8 is shifted outside of the light path to open the shutter diaphragm 9, and as a result, the image in the field to be photographed by the object focussing optical systems La, Lb and Lc is photographed onto the film surface 7, and at the same time, the image on the datum plate 4 is also photographed as a formed image by the focussing lens 6 onto the film surface 7. The image on the datum plate 4 at this time is illuminated by the external light, and when the iris value setting ring 12 is operated, the quantity of transmissive light corresponding to the preset iris value of the photographic objective may be controlled by the iris 14 and controlled by releasing the shutter diaphragm 9 for a predetermined time, and accordingly, the degree of exposure of the image on the datum plate 4 to the film surface 7 corresponds to that of the image in the field to be photographed in the outer field. Therefore, interlocking of the iris 14 with the iris value setting ring 12 may be effected such that the control of light by the iris 14 corresponds to the aperture condition of the photographic objective according to a preset value of the focussing optical system of the datum plate, whereby proper exposure of the image to be photographed on the film surface 7 by the photographic objective may be attained and in addition, data such as characters or the like on the datum plate 4 may be photographed onto the film surface under the proper exposure condition.

As is apparent from the foregoing, according to the lens of the present invention, datum photographing simultaneously with field image photographing may be carried out even in a conventionally used single lens reflex camera, and particularly, the photographing data may be viewed by viewfinder peeping in the stage of preparing photographing data and in addition, the datum image may be illuminated by the external light and the quantity of light may be controlled in interlocking relation with the iris value setting ring of the photographic objective, and as a consequence, the datum image may be photographed under the same exposure condition to the exposure in the field to be photographed merely by setting the data intended for photographing. With such arrangement as described, the present invention offers excellent effects in practical use such that in the photographing under the ordinary proper exposure and even in the photographing intended at the time of photographing for intensifying or desensitizing developing treatment, data photographing equivalent to the image in the field to be photographed may always be carried out without giving any consideration to the datum photographing regardless of using a filter or the like.

While the front sphere rotating type photographic objective which has a reduced number of parts movable within the bodytube has been illustrated for the sake of explanation in the illustrated embodiment of the present invention, it will be noted, of course, that the photographic objective is not limited thereto but various other types of lenses may be applied, and besides the above-described datum plate in which necessary characters or the like are extracted by rotation as described, various other types of plates, one such type being the bayonet type utilizing a plate body with individual datum characters imprinted thereon, can be employed. In the event that, in the lens of the present invention, datum photographing is not required, a partially opaque portion provided on the datum plate is positioned at the lighting window or a cover body may be placed on said window.

While the invention has been particularly shown and described with reference to a preferred embodiment thereof, it will be understood by those skilled in the art that various changes in form and details may be made therein without departing from the spirit and scope of the invention.

What is claimed:

1. In an exchange lens system for a camera supporting a film for photographic recording of a field image, said exchange lens assembly including a bodytube, a camera object focussing optical system mounted within said bodytube for focussing the field image on said film, an iris value setting ring rotatably mounted on said bodytube for controlling the light transmission of incident light from the field image to said film through said focussing optical system, the improvement comprising:
    a light window within said bodytube for transmitting external light incident on said window independent of light transmission through said object focussing system,
    a data plate carrying characters thereon mounted within said bodytube for rotation within the path of incident light passing through said window for optical character transmission,
    a focussing lens for focussing a selected character of said data plate onto said film, and
    a transmission light control member operatively coupled to said iris value setting ring for varying light transmission through said data plate in correspondence with the control of light transmission of said field image through said focussing optical system.

2. The exchange lens assembly as claimed in claim 1, wherein said focussing optical system is concentrically mounted within said bodytube and comprises a plurality of axially spaced spherical lenses whose diameter is somewhat less than the diameter of said bodytube and said transmissive light control member for controlling light transmission through said data plate and onto said film comprises an arcuate member radially mounted between said bodytube and said cylindrical lenses of said focussing optical system and including a plurality of circumferentailly spaced openings of different diameter axially alignable with the focussing lens focussing incident light passing through said light window and said data plate onto said film.

* * * * *